(12) United States Patent
Benchetrit et al.

(10) Patent No.: US 7,406,526 B2
(45) Date of Patent: Jul. 29, 2008

(54) EXTENDED INTERNET PROTOCOL NETWORK ADDRESS TRANSLATION SYSTEM

(76) Inventors: Uri Benchetrit, 2 Moshe Sneh Street, Haifa 34987 (IL); Sergio Kolor, 5/30 Got Levin Street, Haifa (IL); Boaz Bryger, 36 Sapir Street, Zichron Yaacov 30900 (IL); Aviv Asulin, 7 Hayasmin St, Zichron Yaacov 30900 (IL)

( * ) Notice: Subject to any disclaimer, the term of this patent is extended or adjusted under 35 U.S.C. 154(b) by 682 days.

(21) Appl. No.: 09/968,400

(22) Filed: Sep. 28, 2001

(65) Prior Publication Data

US 2003/0065817 A1 Apr. 3, 2003

(51) Int. Cl.
*G06F 15/16* (2006.01)
*G06F 15/173* (2006.01)
*H04L 12/28* (2006.01)
*H04L 12/56* (2006.01)

(52) U.S. Cl. .............. 709/228; 709/244; 709/238; 709/224; 709/242; 370/392; 370/395.31

(58) Field of Classification Search ............. 370/536, 370/395.31, 392; 709/246, 245, 222, 238, 709/224, 220, 221, 228, 244, 242
See application file for complete search history.

(56) References Cited

U.S. PATENT DOCUMENTS

| | | | | |
|---|---|---|---|---|
| 5,999,565 A * | 12/1999 | Locklear, Jr. et al. | ........ | 375/222 |
| 6,160,808 A * | 12/2000 | Maurya | ............. | 370/389 |
| 6,178,448 B1 * | 1/2001 | Gray et al. | ............ | 709/224 |
| 6,526,056 B1 * | 2/2003 | Rekhter et al. | ............ | 370/392 |
| 6,549,996 B1 * | 4/2003 | Manry et al. | ............ | 711/203 |
| 6,563,824 B1 * | 5/2003 | Bhatia et al. | ............ | 370/392 |
| 6,745,224 B1 * | 6/2004 | D'Souza et al. | ............ | 709/202 |
| 6,747,964 B1 * | 6/2004 | Bender | ............ | 370/335 |
| 6,791,982 B2 * | 9/2004 | Westberg | ............ | 370/392 |
| 6,832,255 B1 * | 12/2004 | Rumsewicz et al. | ......... | 709/227 |
| 6,857,009 B1 * | 2/2005 | Ferreria et al. | ............ | 709/219 |
| 7,050,422 B2 * | 5/2006 | Xu et al. | ............ | 370/352 |

(Continued)

OTHER PUBLICATIONS

Egevang, K. et al., "The IP Network Address Translator (NAT)", RFC 1631, May 1994.

(Continued)

*Primary Examiner*—Ario Etienne
*Assistant Examiner*—Gregory G Todd
(74) *Attorney, Agent, or Firm*—Thomas R. Rouse; Richard A. Bachard; Linda G. Gunderson (57) ABSTRACT

A method for transferring data, by establishing network links between a private and a public network. Each link is associated with a respective unique public-network-address. Each session of one or more data packets within the private network is allocated an extended-private-address, the private network being adapted to transfer each data packet in a respective session using at least part of the extended-private-address as an identifying private-network-address. For each session the extended-private-address is translated to an extended-public-address, which includes one of the unique public-network-addresses. The data packets of each session are conveyed between the private and public networks via the link associated with the public-network-address of the respective session, and are transmitted within the public network using at least part of the extended-public-address as an identifying public-network-address.

23 Claims, 4 Drawing Sheets

| EXTENDED PRIVATE-ADDRESS | | LINK | EXTENDED PUBLIC-ADDRESS | | LAST-ACTIVE-TIME |
|---|---|---|---|---|---|
| PRIVATE-NETWORK-ADDRESS | PRIVATE-PORT-NUMBER | | PUBLIC NETWORK-ADDRESS | PUBLIC PORT-NUMBER | |
| 192.168.0.1 | 1024 | 62 | 199.106.96.32 | 4000 | 2001.8.12.1508 |
| 192.168.0.1 | 1025 | 63 | 199.106.96.33 | 4000 | 2001.8.12.1508 |
| 192.168.0.2 | 1024 | 64 | 199.106.96.34 | 4000 | 2001.8.12.1508 |
| 192.168.0.3 | 1024 | 62 | 199.106.96.32 | 4001 | 2001.8.12.1509 |
| 192.168.0.4 | 3000 | 63 | 199.106.96.33 | 4001 | 2001.8.12.1509 |
| 192.168.0.4 | 3020 | 64 | 199.166.96.34 | 4001 | 2001.8.12.1509 |
| 192.168.0.1 | 1028 | 62 | 199.106.96.32 | 4002 | 2001.8.12.1510 |

U.S. PATENT DOCUMENTS

2002/0010866 A1* 1/2002 McCullough et al. ....... 713/201

OTHER PUBLICATIONS

Reynolds, J. et al., "Assigned Numbers", STD 2, RFC 1700, Oct. 1994.

Sklower, K. et al., "The PPP Multilink Protocol (MP)", RFC 1990, Aug. 1996.

Smith, S., "Ascend's Multilink Protocol Plus (MP+)", RFC 1934, Apr. 1996.

Srisuresh, P. et al., "IP Network Address Translator (NAT) Terminology and Connsiderations", RFC 2663, Aug. (1999).

Srisuresh, P. et al., "Traditional IP Network Address Translator (Traditional NAT)", RFC 3022, Jan. 2001.

* cited by examiner

| EXTENDED PRIVATE-ADDRESS | | LINK | EXTENDED PUBLIC-ADDRESS | | LAST-ACTIVE-TIME |
|---|---|---|---|---|---|
| PRIVATE-NETWORK-ADDRESS | PRIVATE-PORT-NUMBER | | PUBLIC NETWORK-ADDRESS | PUBLIC PORT-NUMBER | |
| 192.168.0.1 | 1024 | 62 | 199.106.96.32 | 4000 | 2001.8.12.1508 |
| 192.168.0.1 | 1025 | 63 | 199.106.96.33 | 4000 | 2001.8.12.1508 |
| 192.168.0.2 | 1024 | 64 | 199.106.96.34 | 4000 | 2001.8.12.1508 |
| 192.168.0.3 | 1024 | 62 | 199.106.96.32 | 4001 | 2001.8.12.1509 |
| 192.168.0.4 | 3000 | 63 | 199.106.96.33 | 4001 | 2001.8.12.1509 |
| 192.168.0.4 | 3020 | 64 | 199.166.96.34 | 4001 | 2001.8.12.1509 |
| 192.168.0.1 | 1028 | 62 | 199.106.96.32 | 4002 | 2001.8.12.1510 |

EXTENDED INTERNET PROTOCOL NETWORK ADDRESS TRANSLATION SYSTEM

FIELD OF THE INVENTION

The present invention relates generally to data transfer, and specifically to data transfer between sections of a network.

BACKGROUND OF THE INVENTION

Data networks which are coupled to each other frequently require implementation of network address translation (NAT) as the data transfers between networks. Address translation is necessary when all addresses within the coupled networks are not unique, and "Traditional NAT" is an accepted protocol in the art which describes translation of network addresses. The protocol combines and updates earlier protocols and is described by Srisuresh et al. in Request for Comments (RFC) 3022 of the Internet Engineering Task Force (IETF) Network Working Group (January, 2001), which is incorporated herein by reference. Traditional NAT provides a mechanism for transparently connecting a private network having private addresses to an external public network with globally unique registered addresses.

Figure 1:
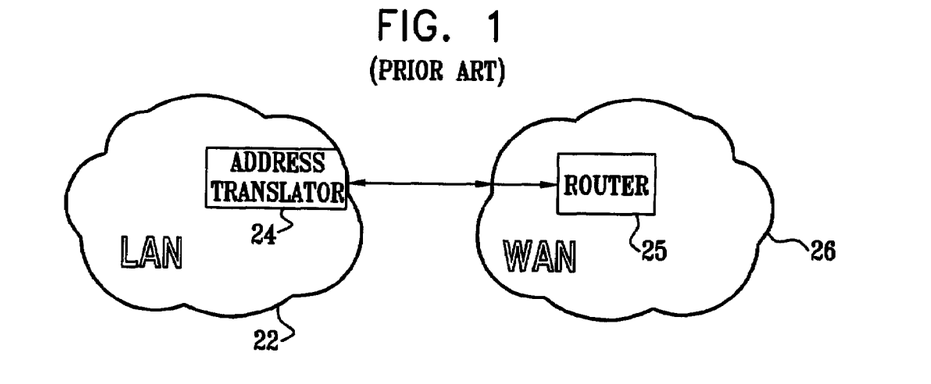
FIG. 1 is a block diagram that schematically illustrates operation of a network address translation protocol, as is known in the art.

FIG. 1 is a block diagram that schematically illustrates operation of RFC 3022, as is known in the art. A private network 22 is coupled via an address translator 24 to an external public network 26. The coupling from translator 24 to network 26 is via a router 25 in the external network. Address translator 24, which typically comprises software components operating in network 22, translates between internal private addresses of network 22 and unique global addresses suitable for use within network 26. The translation is implemented by translator 24 for data transferring in both directions between the two networks. Traditional NAT translates both Internet Protocol (IP) addresses, and Transmission Control Protocol/User Datagram Protocol (TCP/UDP, referred to collectively as TU) port numbers used by these addresses.

The translation is performed by translator 24 forming a binding between local private addresses and allocated external addresses, the binding being determined when an outgoing data transfer session initiates from a private host. (Data transfer sessions are described in more detail below.) The binding takes the form of a mapping between a first ordered pair (source private IP address, source private TU port) and a second ordered pair (assigned external IP address, assigned external TU port). The first ordered pair is effectively a single extended address which is used for data transfer/routing within network 22. The second pair is effectively a single extended address used for data transfer/routing in network 26. The binding is maintained in a table generated by translator 24, and is used for incoming data transfer to the private host, where the ordered pairs are used to generate the destination addresses.

Using address translation allows private network 22 to continue using its private addresses, while enabling the private network to communicate with an external network, where the private addresses might cause conflicts if not translated.

Srisuresh et al., in RFC 2663 of the IETF Network Working Group (August, 1999), which is incorporated herein by reference, clarifies terms used in NAT, and also enlarges on translation processes. RFC 2663 refers to Basic NAT and Network Address Port Translation (NAPT) protocols, which are incorporated into and superceded by Traditional NAT, described above. In section 2.3 of RFC 2663, a session is defined as the set of traffic that is managed as a unit for translation. Traffic of a session is composed of a sequence of one or more packets, and TCP/UDP sessions are uniquely identified by the ordered tuple of (source IP address, source TCP/UDP port, destination IP address, destination TCP/UDP port).

As explained in section 2.4, servers "listen" for incoming connections, typically on the set of port numbers 0-1023. Typically, clients trying to initiate a connection use a source TU port number in the range 1024-65535. However, these ranges are not universally accepted, and instances where a client initiates a connection using a source port number in the range 0-1023, and/or where servers listen on port numbers in the range 1024-65535, are known.

Figure 2:
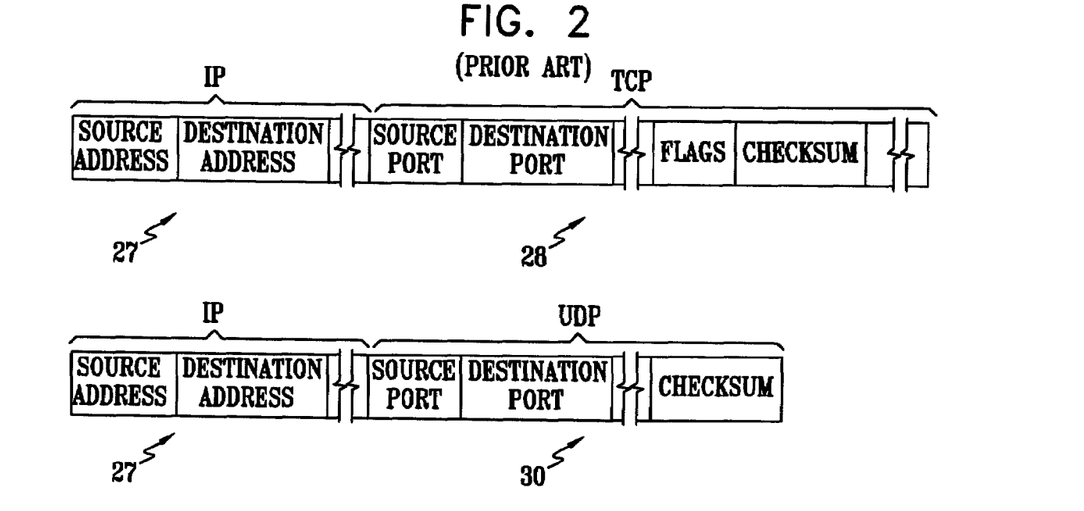
FIG. 2 is a schematic diagram showing headers of Transmission Control Protocol/Internet Protocol and User Datagram Protocol/Internet Protocol data packets, as are known in the art.

FIG. 2 is a schematic diagram showing headers of TCP/IP and UDP/IP data packets, as are known in the art. A TCP/IP packet header comprises an IP header 27 and a TCP header 28. The IP header comprises source and destination addresses. The TCP header comprises source and destination ports, as well as other fields including a flags field and a checksum field. The flags field includes ACK, SYN, RST, and FIN bits. These are respectively used as an acknowledgement of receipt of a packet, a synchronization bit used at the initiation of a connection, a reset bit indicating that a receiver should delete the connection without further interaction, and a control bit which indicates that a sender will send no more data. The checksum field is used as a check on correct data receipt, and is a sum evaluating all data of a packet, including the IP and TCP headers.

A UDP/IP packet header comprises the IP header 27 and a UDP header 30. The UDP header comprises source and destination ports, and a checksum field, which is substantially similar to the checksum field of the TCP header.

Sections 2.5 and 2.6 of RFC 2663 respectively describe methods for determining a start and a finish of a specific session of data packet transfer. A TCP session start can be recognized by the presence of the SYN bit and absence of the ACK bit in a received data packet. "The end of a TCP session can be detected when FIN is acknowledged by both halves of the session, or when either half receives a packet with an RST bit in the TCP flags field." Once these end sections have been detected, RFC 2663 states that, to cover retransmissions due to dropped packets, ". . . a session can be assumed to have been terminated . . . after a period of 4 minutes subsequent to this detection." RFC 2663 also advocates using garbage collection, as a means of detecting when a TCP connection has terminated without the translation device (translator 24 of FIG. 1) being aware of the termination.

For non-TCP sessions, including UDP sessions, RFC 2663 states "there is no deterministic way of recognizing the start of a UDP based session or any non-TCP session. A heuristic approach would be to assume the first packet with hitherto nonexistent session parameters as constituting the start of a new session . . . . In the case of UDP-based sessions, there is no single way to determine when a session ends."

RFC 2663 also suggests using timing to terminate sessions, e.g. by assuming that "TCP sessions that have not been used for say, 24 hours, and non-TCP sessions that have not been used for a couple of minutes, are terminated." Alternatively or additionally, "Another way to handle session terminations is to timestamp entries and keep them as long as possible and retire the longest idle session when it becomes necessary."

In section 4.1.2 of RFC 2663, the authors state that the Basic NAT and NAPT protocols can be combined so that a pool of external addresses are used in conjunction with port translation.

In order to increase the rate at which communications are transferred between points, it is known in the art to use multiple links in parallel. For example, in place of the point-to-point protocol (PPP) that provides a single link for digital packet communications between computers, the PPP Multilink Protocol may be used. This protocol is described by Sklower et al., in RFC 1990 of the IETF Network Working Group (August, 1996), which is incorporated herein by reference.

Figure 3:
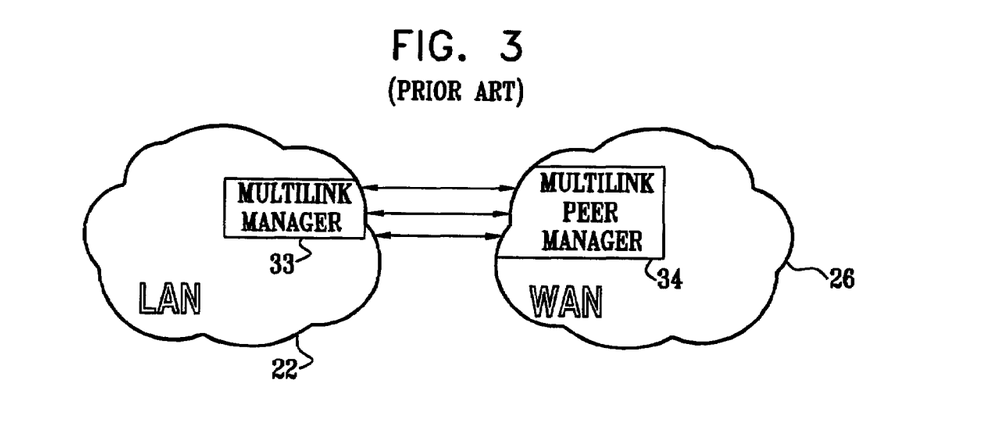
FIG. 3 is a block diagram that schematically illustrates operation of a multilink protocol, as is known in the art.

FIG. 3 is a block diagram that schematically illustrates operation of RFC 1990, as is known in the art. As for the PPP protocol, two software components, a multilink manager 33 and a multilink manager peer 34, are required. The multilink connection between the two components is set up by manager 33 transmitting a Link Control Protocol (LCP) request to manager peer 34. Once manager peer 34 acknowledges that it is able to accept the multilink connection, transfer of data packets via the parallel multilinks is possible. The transfer occurs by manager 33 fragmenting data into sequenced packets, which are then sent to peer 34, where the sequenced packets are reassembled into the original data. The PPP Multilink Protocol provides a framework for tracking the data fragments sent on each link of the multilink, and for insuring that the fragments are reassembled in their correct order at manager peer 34.

Figure 4:
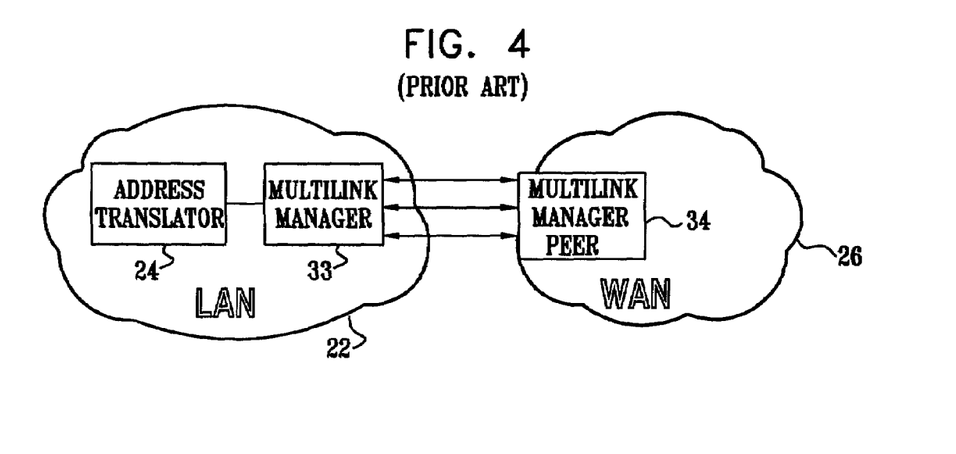
FIG. 4 is a block diagram that schematically illustrates combination of the processes of address translation and multilink transfer, as is known in the art.

FIG. 4 is a block diagram that schematically illustrates combination of the processes of address translation and multilink transfer, as is known in the art. In transferring data from private network 22 to external network 26, address translation is first performed in translator 24, and then the data is transferred via multilink manager 33, after the latter has set up a multilink with multilink manager peer 34.

SUMMARY OF THE INVENTION

It is an object of some aspects of the present invention to provide a method and apparatus for conveying sets of data between a private network and a public network via a parallel linkage.

It is a further object of some aspects of the present invention to provide a method and apparatus for coupling the linkage utilizing one linkage manager.

In preferred embodiments of the present invention, a multilink connection is made between a private network and a public network. The connection comprises two or more links which are each able to transfer sessions of data packets between the two networks, so that the connection acts as a parallel data coupling. The connection is managed by one extended-multilink-manager, which most preferably resides in the private network, and which assigns a unique public-network-address to each link. The data packets of a specific session generated by a private network client have an extended-private-address, unique to the private network, formed from the client's address and a port used by the client. The extended-multilink-manager translates the extended-private-address to an extended-public-address, the latter including one of the link public-network-addresses. The data packets of the session are transferred to the public network by the extended-multilink-manager via the link having the public-network-address assigned to the data packets.

The extended-multilink-manager thus assigns unique addresses to each link, translates an address of data packets of a session to an address including one of the link addresses, and then transmits the data packets via the link. Unlike prior art systems, the extended-multilink-manager in preferred embodiments of the present invention does not require a peer system in order to manage full operation of the multilink connection. Furthermore, the extended-multilink-manager combines the tasks of data packet address translation and data packet conveyance over multiple links.

The extended-multilink-manager maintains a table with a mapping between the extended-private-address and the extended-public-address. The mapping is applied to all transmitted data packets in the session, and for reverse direction data packets, such as acknowledgments, received by the manager and which are directed to the private network client.

There is therefore provided, according to a preferred embodiment of the present invention, a method for transferring data, including:

establishing a plurality of network links between a private network and a public network;

associating each link with a respective unique public-network-address;

generating sessions within the private network, each session comprising one or more data packets;

allocating to each session an extended-private-address, the private network being adapted to transfer each data packet comprised in a respective session using at least part of the extended-private-address as an identifying private-network-address;

translating for each session the extended-private-address to an extended-public-address, the extended-public-address comprising one of the unique public-network-addresses;

conveying the one or more data packets of each session between the private network and the public network via the link associated with the public-network-address of the respective session; and transmitting the one or more data packets of each session within the public network using at least part of the extended-public-address as an identifying public-network-address.

Preferably, at least one of the plurality of network links is implemented using one or more couplings chosen from conductive cabling, fiber optic cabling, and a wireless link.

Preferably, conveying the one or more data packets includes conveying the data packets via one or more methods of transmission chosen from a dialup asynchronous line, a leased synchronous line, a cellular data link, and a cellular communication system channel.

Preferably, at least one of the plurality of links includes a second plurality of lines operating in parallel, and conveying the one or more data packets includes:

dividing the one or more data packets amongst the second plurality of lines; and conveying the one or more data packets via the second plurality of lines in a multiplexed manner.

Preferably, associating each link with a respective unique public-network-address includes choosing the respective unique public-network-address from a pool of addresses provided by the public network.

Preferably, the method includes generating a table mapping the extended-private-address to the extended-public-address, wherein translating for each session the extended-private-address to the extended-public-address includes using the extended-private-address as a pointer in the table.

Further preferably, the method also includes receiving a public-network-data-packet originating from the public network and having the extended-public-address as an address, and using the extended-public-address as a pointer in the table so as to recover the extended-private-address.

Preferably, generating sessions includes initiating each of the sessions responsive to the extended-private-address of the respective session not appearing in the table.

Preferably, the method includes receiving a public-network-data-packet originating from the public network and having the extended-public-address as an address, and conveying the public-network-data-packet between the public network and the private network via the link associated with the public-network-address.

Preferably, allocating to each session the extended-private-address includes incorporating a private-port-number in the extended-private-address, so that the extended-private-address acts as an identifier of the session.

Preferably, translating for each session the extended-private-address to the extended-public-address includes incorporating a public-port-number in the extended-public-address, so that the extended-public-address acts as an identifier of the session.

Preferably, the unique public-network-address includes an Internet Protocol (IP) address.

Preferably, the extended-private-address includes an IP address.

There is further provided, according to a preferred embodiment of the present invention, apparatus for transferring data between a private network and a public network, including:

a plurality of network links, coupled to convey data packets between the private and public networks; and an extended-multilink-manager, adapted to:

associate each of the plurality of network links with a respective unique public-network-address, receive sessions generated within the private network, each of the sessions consisting of one or more of the data packets, allocate to each of the sessions an extended-private-address, the private network being adapted to transfer each of the data packets included in a respective session using at least part of the extended-private-address as an identifying private-network-address, translate for each of the sessions the extended-private-address to an extended-public-address, the extended-public-address including one of the respective unique public-network-addresses, and convey the one or more data packets of each of the sessions between the private network and the public network via the link associated with the public-network-address of the respective session, for transmission within the public network using at least part of the extended-public-address as an identifying public-network-address.

Preferably, at least one of the plurality of network links includes one or more couplings chosen from conductive cabling, fiber optic cabling, and a wireless link.

Preferably, the extended-multilink-manager is adapted to convey the one or more data packets via one or more methods of transmission chosen from a dialup asynchronous line, a leased synchronous line, a cellular data link, and a cellular communication system channel.

Preferably, at least one of the plurality of network links includes a second plurality of lines operating in parallel, and the extended-multilink-manager is adapted to:

divide the one or more data packets amongst the second plurality of lines; and convey the one or more of the data packets via the second plurality of lines in a multiplexed manner.

Preferably, the extended-multilink-manager is adapted to choose the respective unique public-network-address from a pool of addresses provided by the public network.

Preferably, the extended-multilink-manager is adapted to generate a table mapping the extended-private-address to the extended-public-address, and to translate for each session the extended-public-address to the extended-public-address using the extended-private-address as a pointer in the table.

Further preferably, the extended-multilink-manager is adapted to receive a public-network-data-packet originating from the public network and having the extended-public-address as an address, and to use the extended-public-address as a pointer in the table so as to recover the extended-private-address.

Preferably, the extended-multilink-manager is adapted to receive a public-network-data-packet originating from the public network and having the extended-public-address as an address, and to convey the public-network-data-packet between the public network and the private network via the link associated with the public-network-address.

Further preferably, the extended-multilink-manager is adapted to initiate each of the sessions responsive to the extended-private-address of the respective session not appearing in the table.

Preferably, the extended-multilink-manager is adapted to incorporate a private-port-number in the extended-private-address, so that the extended-private-address acts as an identifier of the session.

Preferably, the extended-multilink-manager is adapted to incorporate a public-port-number in the extended-public-address, so that the extended-public-address acts as an identifier of the session.

Preferably, the unique public-network-address includes an Internet Protocol (IP) address.

Preferably, the extended-private-address includes an IP address.

Preferably, the extended-multilink-manager is implemented in the private network.

The present invention will be more fully understood from the following detailed description of the preferred embodiments thereof, taken together with the drawings, in which:

DETAILED DESCRIPTION OF PREFERRED EMBODIMENTS

Figure 5:
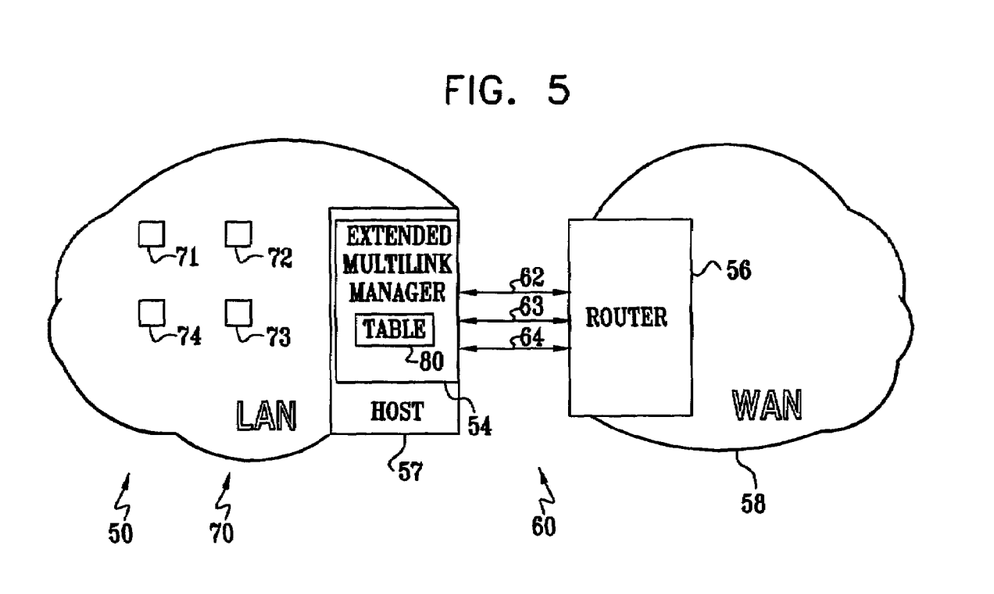
FIG. 5 is a schematic diagram of a multilink connection system, according to a preferred embodiment of the present invention.

Reference is now made to FIG. 5, which is a schematic diagram of a multilink connection system 50, according to a preferred embodiment of the present invention. A private network 52, such as a Local Area Network (LAN), comprises computing systems which are in communication with each other by one or more methods known in the art. By way of example, network 52 is assumed to comprise four host computers 71, 72, 73, 74, which respectively have Internet Protocol (IP) private-network-addresses 192.168.0.1, 192.168.0.2, 192.168.0.3, and 192.168.0.4. Computers 71, 72, 73, 74 are also termed herein computers 70. The private-network-addresses are used by computers 70 as source and/or destination addresses for IP data packets sent in sessions between the computers. In addition, each of computers 71, 72, 73, 74 is assigned a range of private Transmission Control Protocol/User Datagram Protocol (TCP/UDP, referred to collectively as TU) port numbers. In combination an ordered pair (private-network-address, private-TU-port-number) forms a unique extended-private-address for each session of IP data packets transferred within network 52. However, the extended-private-addresses are not able to be used as such outside network 52, since they are only unique within network 52.

Network 52 further comprises an extended-multilink-manager 54, which is able to transfer sessions of data packets to and from computers 70 in substantially the same way as the computers communicate with each other. Extended-multilink-manager 54, hereinbelow termed manager 54, comprises one or more software components preferably installed in a host 57 of network 52. A plurality of links, herein by way of example assumed to be three links 62, 63, and 64, couple manager 54 and a router 56 comprised in a public network 58. Links 62, 63, and 64 are also termed herein links 60. Manager 54 functions to route data packets between host 57 and router 56, via links 60, as described in more detail below. Network 58 may be any distributed network which utilizes globally unique addresses for entities operative within the network, and which is able to transmit industry-standard data packets, including IP data packets. Links 60 are implemented physically from one or more systems or combination of systems, known in the art, for transfer of data, such as conductive cabling, fiber optic cabling, and/or wireless links. Methods of transmission of data via links 60 use one or more methods known in the art, such as dialup asynchronous lines, leased synchronous lines, cellular data links, and/or one or more channels in a cellular communication system. In some preferred embodiments of the present invention, at least one of links 60 comprises a plurality of lines operating in parallel, each of the lines transmitting according to any method known in the art, such as those listed above. Data is conveyed over the plurality of lines in a multiplexed manner by dividing the data amongst the lines, using a multiplexing method known in the art.

Figure 6:
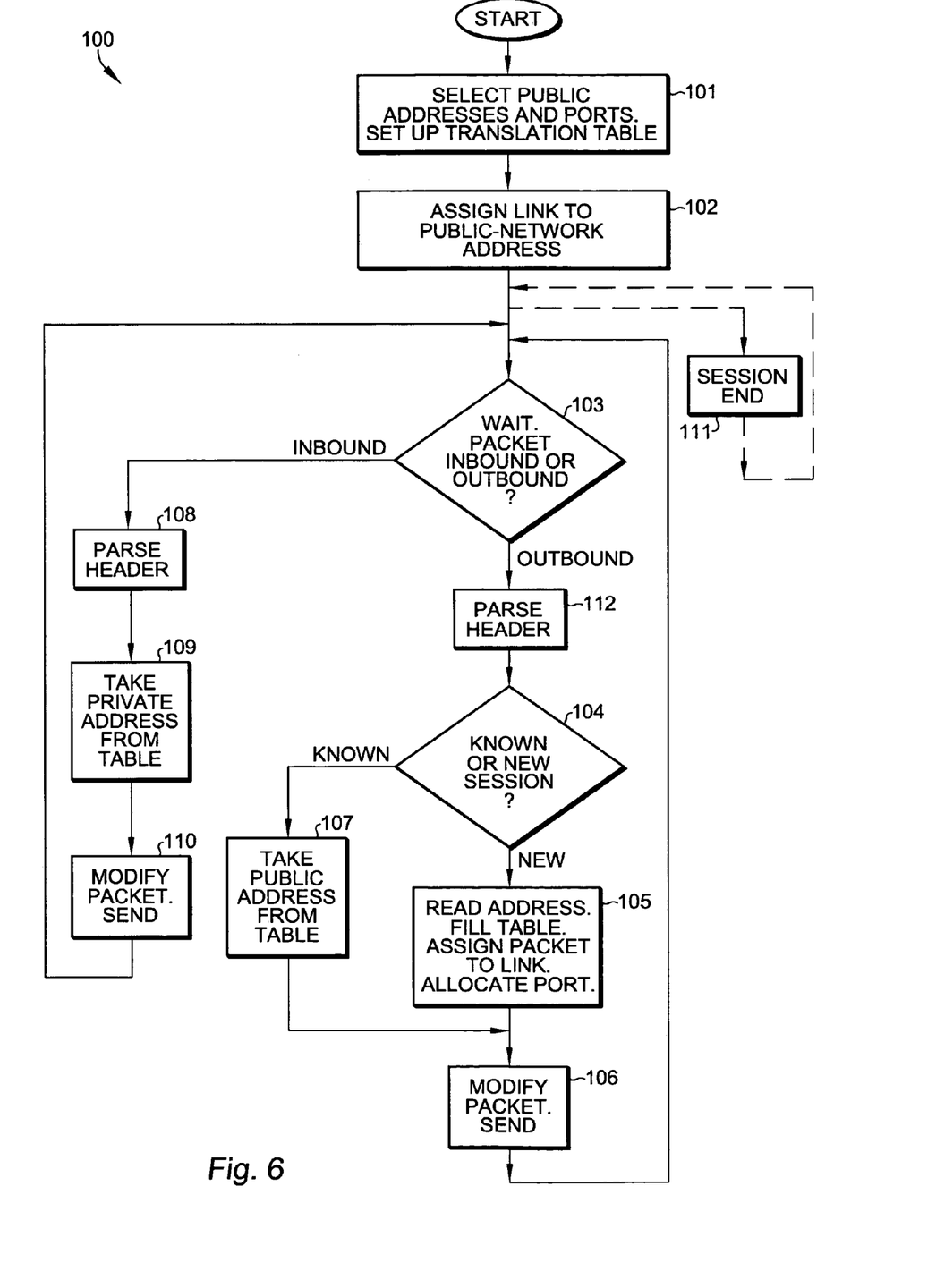
FIG. 6 is a flowchart showing steps involved in a process of data packet transfers in the system of FIG. 5, according to a preferred embodiment of the present invention.
Figure 7:
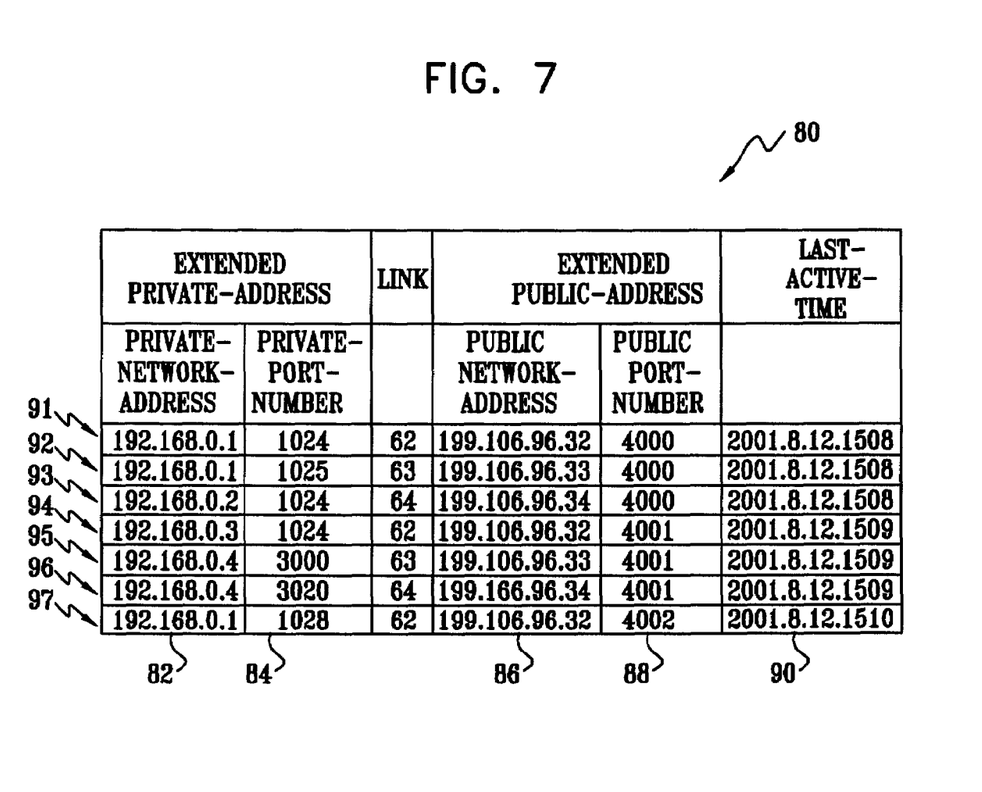
FIG. 7 is an example of entries in a table generated during the process of FIG. 6, according to preferred embodiments of the present invention.

FIG. 6 is a flowchart showing steps involved in a process 100 of data packet transfers, and FIG. 7 is an example of entries in a table 80 generated during process 100, according to preferred embodiments of the present invention. Process 100 applies during an outbound session of data packet transfers, where an initial data packet of the session originates from the private network.

In an initialization step 101, manager 54 chooses public-network-addresses which are to be used in process 100. Most preferably, the public-network-addresses are chosen from an available set of addresses provided to manager 54 by network 58, for example, as described with reference to section 4.1.2 of RFC 2663 in the Background of the Invention. Manager 54 also selects a range of public-port-numbers, which are to be used when sessions are transmitted in process 100. Preferably, the range of port numbers comprises numbers from one of the ranges suggested in RFC 2663, as described in the Background of the Invention. Also in the initialization step, manager 54 constructs a table 80 which, as described in more detail below, comprises mappings relating private-network-addresses to public-network-addresses, and which the manager maintains in an on-going basis.

In an assign link step 102 manager 54 allocates to each of links 60 a unique public-network-address (selected from those chosen in step 101) which is compatible with operation in public network 58. Herein, links 62, 63, and 64 are assumed to have respective addresses 199.106.96.32, 199.106.96.33, and 199.106.96.34.

In a wait-for-packets decision step 113, manager 54 waits for arrival of a packet. If the packers are received (i.e. Yes), then the process continues to step 103 to determine whether the packets are inbound or outbound. Otherwise, if packets are not received (i.e. No), the process 100 continues to step 111 to end the session.

If the packet is an outbound packet, in a step 112 the header of the packet is parsed. From the parsing, in a decision step 104 manager 54 decides if the packet belongs to a session which has been already initiated in process 100. Preferably, if the packet is a TCP packet, manager 54 recognizes the packet as being the first packet of a session, by checking for the presence of a SYN bit and absence of an ACK bit in the TCP flags. Alternatively, if the packet is a non-TCP packet such as a UDP packet, manager 54 recognizes the packet as being the first packet of a session by finding that session parameters defined by the packet, described below, are not comprised in table 80. The above methods for determining the start of a session are described in more detail in the Background of the Invention with reference to RFC 2663.

In a new session step 105, manager 54 reads a private-network-address and a private-TU-port-number from the source extended-private-address of the packet. The values are respectively entered into columns 82 and 84 of table 80. Manager 54 then assigns a public-network-address and a public-TU-port-number, forming a source extended-public-address, to the packet. The public-network-address is chosen from one of the public-network-addresses assigned to links 60 in step 102, and further details of a method of choosing is given below, in reference to parameters comprised in table 80. Thus, the packet is assigned to the link corresponding to the public-network-address. The port number is chosen according to a convention which manager 54 has been set to follow, examples of which are described in the Background of the Invention, the number being picked from the range of public-port-numbers selected in step 101. Herein, manager 54 is assumed to be able to assign public-TU-port-numbers in a range 1024-65535. The source public-network-address and public-TU-port-number are respectively entered into columns 86 and 88 of table 80.

In a transmit packet step 106 the source public-network-address and public-TU-port-number are placed in the header of the data packet instead of the source private-network-address and private-TU-port-number. In addition to modifying the header of the data packet with new addresses, manager 54 modifies any original checksum parameter having a value dependent on the addresses, so that the new checksum and the extended-public-address are consistent. Methods for computing the checksum will be apparent to those skilled in the art. The modified packet is then transmitted via the specific link 60 corresponding to the public-network-address assigned to the data packet in step 105.

Returning to step 104, after parsing the outbound packet, manager 54 is able to determine if the packet is comprised in an existing session by checking if the private-network-address and private-TU-port-number are present in columns 82 and 84. If the packet does belong to an existing session, in a step 107 manager 54 uses the parsed data, comprising an existing extended-private-address, as a pointer to table 80.

The corresponding extended-public-address is used to modify the packet header, and the checksum of the packet is modified as necessary.

Returning to step 103, if the packet is an inbound packet, in a step 108 the header of the packet is parsed to determine if the packet belongs to a known session, i.e., has an extended-public-address in table 80. (A typical inbound data packet of a known session is a packet acknowledging receipt of an outbound data packet.) Process 100 then continues to a step 109, wherein the extended-public-address found in step 108 is used as a pointer to table 80, so as to generate the corresponding extended-private-address. In a step 110, the inbound packet is modified with the extended-private-address, a revised checksum is generated, and the modified inbound packet is transmitted into the private network.

In the case of inbound packets, router 56 conveys these data packets to manager 54 via the link associated with the packet, by matching the address comprised in the packet with the corresponding link address. It will be appreciated that router 56 acts as a "standard" router, directing the return packets to corresponding links. Thus, in contrast to prior art systems, router 56 does not need to be implemented as a peer to manager 54.

In a session end step 111, which most preferably runs concurrently with steps 103-110, manager 54 checks if a session initiated in step 105 has been completed. Most preferably, determination of completion of a session is by one of the methods described in section 2.6 of RFC 2663, which are summarized in the Background of the Invention.

For example, table 80 comprises a time column 90, and in step 105, a last-active-time when the first packet of the session arrives at manager 54 is entered into column 90. As more data packets for the session arrive (steps 107 and 109), manager 54 updates the last-active-time. As other data transfer sessions occur, manager 54 continues to enter extended-private-network and extended-public-network addresses for each session, together with corresponding values for the last-active-time, into table 80. Manager 54 continues to fill table 80 with new session parameters until the table is full, at which point the manager overwrites the data session which has been idle for the longest time, and the data session is assumed to be finished.

An example of parameters entered during seven substantially simultaneous data transfer sessions is shown in FIG. 7, where it is assumed that links 60 are assigned by manager 54 on a cyclical basis, as a new session begins. It will be appreciated that other methods exist for choosing which of a plurality of parallel links is used for data transmission. All such methods known in the art are considered to be comprised within preferred embodiments of the present invention. For example, manager 54 may monitor traffic on each of links 60 and assign the links in order to balance loading of the links. Alternatively or additionally, manager 54 may assign links 60 according to characteristics, such as data transfer capacity, of the specific links.

Rows 91 and 92 have data session parameters from data sessions originating from the same host computer 71 (FIG. 5), which assigned the sessions private-port-numbers 1024 and 1025 respectively. Manager 54 assigns links 62 and 63, and corresponding public-network-addresses of 199.106.96.32 and 199.106.96.33, to the two sessions. Each session is allocated a public-port-number, which in these sessions are both set at 4000. It will be understood that since the public-network-addresses of the two sessions are distinct, no conflict occurs by the two sessions having the same public-port-number. Rows 93-95 correspond to sessions generated by computers 72, 73, and 74, and row 96 is a second session from computer 74.

Row 97 shows parameters for a third session from computer 71. Manager 54 allocates this session to be transmitted on link 62, and distinguishes the session from that of row 91, transmitted on the same link, by assigning a public-port-number of 4002. As is seen in table 80, each session has a unique extended-private-address which maps to a corresponding unique extended-public-address. The public-network-address section of the extended-public-address corresponds to the link along which data of the session is transferred. The mapping is used for session data transferring in both directions between the public and private networks.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for transferring data, comprising:

establishing a plurality of network links between a private network and a public network;

associating each link with a respective unique public-network-address;

generating sessions within the private network, each session comprising one or more data packets;

allocating to each session an extended-private-address comprising a private-network-address and private-port-number, the private network being adapted to transfer each data packet comprised in a respective session using at least part of the extended-private-address as an identifying private-network-address;

translating for each session the extended-private-address to an extended-public-address comprising a public-network-address and public-port-number, the extended-public-address comprising one of the unique public-network-addresses;

determining for each session a last-active-time representing a most recent time of arrival of the corresponding one or more data packets at a manager in the private network;

filling for each session an address table with the extended-private-address, the corresponding extended-public address, and the corresponding last-active-time;

determining that the address table is full of sessions in response to filling the address table;

identifying the session in the address table having the oldest last-active-time, representing the session which has been idle for the longest time, in response to the address table being full of sessions;

overwriting the session in the address table having the oldest last-active-time with a new session, having a corresponding extended-private-address, a corresponding extended-public address, and a corresponding last-active-time, in response to the address table being full of sessions;

conveying the one or more data packets of each session between the private network and the public network via the link associated with the public-network-address of the respective session; and transmitting the one or more data packets of each session within the public network using at least part of the extended-public-address as an identifying public-network-address.

2. A method according to claim 1, wherein at least one of the plurality of network links is implemented using one or more couplings chosen from conductive cabling, fiber optic cabling, and a wireless link.

3. A method according to claim 1, wherein conveying the one or more data packets comprises conveying the data packets via one or more methods of transmission chosen from a dialup asynchronous line, a leased synchronous line, a cellular data link, and a cellular communication system channel.

4. A method according to claim 1, wherein at least one of the plurality of links comprises a second plurality of lines operating in parallel, and wherein conveying the one or more data packets comprises:
dividing the one or more data packets amongst the second plurality of lines; and
conveying the one or more data packets via the second plurality of lines in a multiplexed manner.

5. A method according to claim 1, wherein associating each link with a respective unique public-network-address comprises choosing the respective unique public-network-address from a pool of addresses provided by the public network.

6. A method according to claim 1, and comprising generating a table mapping the extended-private-address to the extended-public-address, wherein translating for each session the extended-private-address to the extended-public-address comprises using the extended-private-address as a pointer in the table.

7. A method according to claim 6, and comprising receiving a public-network-data-packet originating from the public network and having the extended-public-address as an address, and using the extended-public-address as a pointer in the table so as to recover the extended-private-address.

8. A method according to claim 6, wherein generating sessions comprises initiating each of the sessions responsive to the extended-private-address of the respective session not appearing in the table.

9. A method according to claim 1, and comprising receiving a public-network-data-packet originating from the public network and having the extended-public-address as an address, and conveying the public-network-data-packet between the public network and the private network via the link associated with the public-network-address.

10. A method according to claim 1, wherein the unique public-network-address comprises an Internet Protocol (IP) address.

11. A method according to claim 1, wherein the extended-private-address comprises an IP address.

12. Apparatus for transferring data between a private network and a public network, comprising:
a plurality of network links, coupled to convey data packets between the private and public networks; and
an extended-multilink-manager, adapted to:
associate each of the plurality of network links with a respective unique public-network-address,
receive sessions generated within the private network, each of the sessions comprising one or more of the data packets,
allocate to each of the sessions an extended-private-address comprising a private-network-address and private-port-number, the private network being adapted to transfer each of the data packets comprised in a respective session using at least part of the extended-private-address as an identifying private-network-address,
translate for each of the sessions the extended-private-address to an extended-public-address comprising a public-network-address and public-port-number, the extended-public-address comprising one of the respective unique public-network-addresses,
determine for each session a last-active-time representing a most recent time of arrival of the corresponding one or more data packets at a manager in the private network,
fill for each session an address table with the extended-private-address, the corresponding extended-public address, and the corresponding last-active-time,
determine that the address table is full of sessions in response to filling the address table,
identify the session in the address table having the oldest last-active-time, representing the session which has been idle for the longest time, in response to the address table being full of sessions,
overwrite the session in the address table having the oldest last-active-time with a new session, having a corresponding extended-private-address, a corresponding extended-public address, and a corresponding last-active-time, in response to the address table being full of sessions,
convey the one or more data packets of each of the sessions between the private network and the public network via the link associated with the public-network-address of the respective session, for transmission within the public network using at least part of the extended-public-address as an identifying public-network-address.

13. Apparatus according to claim 12, wherein at least one of the plurality of network links comprises one or more couplings chosen from conductive cabling, fiber optic cabling, and a wireless link.

14. Apparatus according to claim 12, wherein the extended-multilink-manager is adapted to convey the one or more data packets via one or more methods of transmission chosen from a dialup asynchronous line, a leased synchronous line, a cellular data link, and a cellular communication system channel.

15. Apparatus according to claim 12, wherein at least one of the plurality of network links comprises a second plurality of lines operating in parallel, and wherein the extended-multilink-manager is adapted to:
divide the one or more data packets amongst the second plurality of lines; and
convey the one or more of the data packets via the second plurality of lines in a multiplexed manner.

16. Apparatus according to claim 12, wherein the extended-multilink-manager is adapted to choose the respective unique public-network-address from a pool of addresses provided by the public network.

17. Apparatus according to claim 12, wherein the extended-multilink-manager is adapted to generate a table mapping the extended-private-address to the extended-public-address, and to translate for each session the extended-private-address to the extended-public-address using the extended-private-address as a pointer in the table.

18. Apparatus according to claim 17, wherein the extended-multilink-manager is adapted to receive a public-network-data-packet originating from the public network and having the extended-public-address as an address, and to use the extended-public-address as a pointer in the table so as to recover the extended-private-address.

19. Apparatus according to claim 17, wherein the extended-multilink-manager is adapted to receive a publicnetwork-data-packet originating from the public network and having the extended-public-address as an address, and to convey the public-network-data-packet between the public network and the private network via the link associated with the public-network-address.

20. Apparatus according to claim 17, wherein the extended-multilink-manager is adapted to initiate each of the sessions responsive to the extended-private-address of the respective session not appearing in the table.

21. Apparatus according to claim 12, wherein the unique public-network-address comprises an Internet Protocol (IP) address.

22. Apparatus according to claim 12, wherein the extended-private-address comprises an IP address.

23. Apparatus according to claim 12, wherein the extended-multilink-manager is implemented in the private network.

* * * * *